US012792115B2

(12) United States Patent
Hodigere et al.

(10) Patent No.: US 12,792,115 B2
(45) Date of Patent: Nov. 10, 2026

(54) FILTERING DATA CENTER POWER LOAD TRANSIENTS CAUSED BY ARTIFICIAL INTELLIGENCE (AI) WORKLOADS

(71) Applicant: Microsoft Technology Licensing, LLC, Redmond, WA (US)

(72) Inventors: Arun Venkatasubbaiah Hodigere, Bengaluru (IN); Bhushan Mehendale, Bellevue, WA (US); Anand Haridass, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 18/933,160

(22) Filed: Oct. 31, 2024

(65) Prior Publication Data

US 2026/0118930 A1 Apr. 30, 2026

(51) Int. Cl.
*G06F 1/26* (2006.01)
*G06F 9/30* (2018.01)
(Continued)

(52) U.S. Cl.
CPC .............. *G06F 1/26* (2013.01); *H04L 47/824* (2013.01); *G06F 9/3017* (2013.01); *G06F 9/5044* (2013.01); *G06F 9/505* (2013.01); *G06F 9/5077* (2013.01); *G06F 2209/501* (2013.01); *G06F 2209/5011* (2013.01); *G06F 2209/503* (2013.01); *H04L 47/805* (2013.01); *H04L 63/102* (2013.01); *H04L 67/1029* (2013.01); *H04L 67/60* (2022.05)

(58) Field of Classification Search
CPC ................. G06F 1/26; G06F 2209/501; G06F 2209/5011; G06F 2209/503; G06F 9/3017; G06F 9/5044; G06F 9/505; G06F 9/5077; H04L 47/805; H04L 47/824; H04L 63/102; H04L 67/1029; H04L 67/60
See application file for complete search history.

(56) References Cited

U.S. PATENT DOCUMENTS

2016/0179173 A1 6/2016 Eastep
2019/0121671 A1* 4/2019 Guim Bernat .......... G06F 9/505
2020/0097328 A1* 3/2020 Li ......................... G06F 21/606

OTHER PUBLICATIONS

International Search Report and Written Opinion received for PCT Application No. PCT/US2025/039981, Mailed on Dec 10, 2025, 16 Pages.

* cited by examiner

*Primary Examiner* — Terrell S Johnson

(57) ABSTRACT

Systems and methods are provided for filtering data center power load transients caused by AI workloads. In examples, a workload orchestrator receives a first signal indicating that a first plurality of compute nodes is starting a compute phase during which artificial intelligence ("AI") workloads are executed by AI accelerators on the first plurality of compute nodes. In response to receiving the first signal, the workload orchestrator causes a second plurality of compute nodes to stop execution of general (non-AI) workloads. The workload orchestrator receives a second signal indicating that the first plurality of compute nodes has completed the compute phase and is starting a communication phase during which AI data is exchanged among the AI accelerators on the first plurality of compute nodes. In response to receiving the second signal, the workload orchestrator causes the second plurality of compute nodes to continue execution of the general workloads.

20 Claims, 10 Drawing Sheets

(51) Int. Cl.

| | |
|---|---|
| ***G06F 9/50*** | (2006.01) |
| ***H04L 9/40*** | (2022.01) |
| ***H04L 47/70*** | (2022.01) |
| ***H04L 47/80*** | (2022.01) |
| ***H04L 67/1029*** | (2022.01) |
| ***H04L 67/60*** | (2022.01) |

200C

200D

300B

500A

500B

FILTERING DATA CENTER POWER LOAD TRANSIENTS CAUSED BY ARTIFICIAL INTELLIGENCE (AI) WORKLOADS

BACKGROUND

Data Centers are increasingly being tasked with running artificial intelligence ("AI") training workloads that often span thousands of nodes and hundreds of thousands of graphics processing units ("GPUs"). Training algorithms that are used for the AI training workloads present a synchronous characteristic of switching between compute-intensive and communication-intensive phases, simultaneously across the hundreds of thousands of GPUs in the data center, and for a long duration (e.g., a few weeks to several months). This synchronous characteristic corresponds to high-power, high frequency load characteristics that are continually drawn from the local electrical power grid over the long duration, thus affecting the local electrical power grid and the underlying electrical utility. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for filtering data center power load transients caused by AI workloads. The present technology utilizes a data center implementation that has a heterogeneous compute configuration that combines general compute and AI compute functionalities in the same rack, row, and/or cluster. Data center load balancing is implemented between general compute workloads and AI workloads to reduce AC power transient loads on the local electrical power grid due to typical AI workload power draw characteristics. In particular, dynamic control of a power cap and throttle functionalities is used to balance power consumed by the general compute racks, rows, and/or clusters.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1:
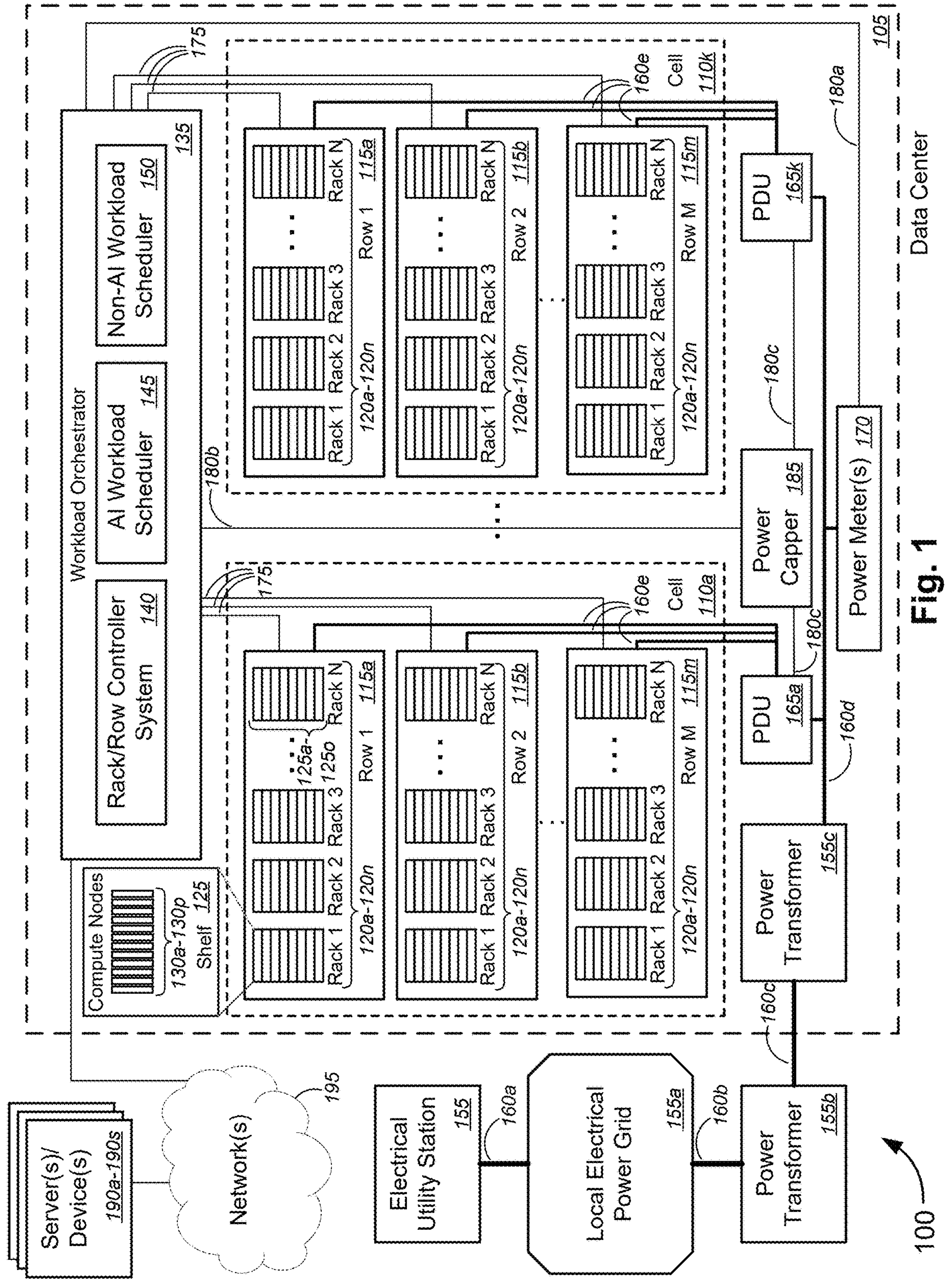
FIG. 1 depicts an example system for implementing filtering of data center power load transients caused by AI workloads.

As briefly discussed above, AI training workloads often span thousands of nodes and hundreds of thousands of GPUs. The training algorithms that are used for the AI training workloads present a synchronous characteristic of switching between compute-intensive and communication-intensive phases, across the hundreds of thousands of GPUs at the same time. The training jobs are known to run for a long interval—a few weeks to several months, while continually presenting these load characteristics to the local electrical power grid. The AI training workloads are synchronous, with a period of high-power draw (or ON time) corresponding to when AI accelerators are engaged in computation functions during which training occurs, and with a period of low-power draw (or OFF time) corresponding to when AI accelerators are engaged in communication functions during which AI data (or weights) are exchanged among the AI accelerators within and across equipment racks in a data center.

AI training workloads today have a duty cycle of about 10-40 seconds of ON time and about 1-4 seconds of OFF time. Typically, the OFF time duty cycle is about 10% of the ON time. AI models of the future are expected to have higher duty cycles, with ON time of about 60-100 seconds and OFF time between about 6-10 seconds. In an example, a data center might consume about 19 megawatts (MW) at ON time and about 12 MW at OFF time, which represents a swing of about 6-7 MW in terms of power load on the power grid periodically every tens of seconds. During compute-intensive periods, the combined GPU/accelerator power draw is roughly about 60% of the entire node power draw. This means that as the workload transitions between communication to compute intensive periods, the power swing is roughly about 40% of the total node, rack, and/or data center power draw, which is on the order of hundreds of kilowatts (kW) or tens of MW. The frequency and amplitude of these power swings can lead to electrical challenges for electrical utility power distribution to the data center. For example, large scale power ramps within a short interval are difficult to handle or service at electrical power grids. Also, large power oscillations from the workload can cause grid instability.

Current approaches to reduce the power swings between ON (or compute) and OFF (or idle) periods seek to burn power during the OFF period to an extent that it reduces the power swing to levels acceptable to the electrical power grid, by implementing either software/hardware power burn or energy storage solutions. For software/hardware power burn, when GPU or accelerator software and/or hardware detects idle or inactive compute periods (or OFF times), either an AI workload orchestrator executes or runs a dummy workload on the GPUs and/or accelerators to consume or burn power, and/or GPU or accelerator hardware utilizes manufacturer proprietary algorithms to elevate the power consumed by the GPU or accelerator. The disadvantage with this approach, however, is the waste of energy. For energy storage solutions, devices having large energy storage capacitors are plugged into data center racks to absorb or sink energy during OFF times and source or deliver energy during ON times to reduce the power swings. The disadvantage with this approach, however, is that it is expensive to implement.

The present technology provides for filtering data center power load transients caused by AI workloads, by dedicating some general compute racks (e.g., non-AI compute racks) in the data center that are synchronized to consume more power during AI workload OFF times and are power limited during AI workload ON times. In this manner, active workloads (in this case, general workloads) are run during AI OFF times to productively burn power, while the general workloads are throttled during AI ON times, thereby reducing the power swing, without wasting power and without incurring costs associated with using expensive equipment (such as energy storage capacitors or similar energy storage solutions).

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-6 illustrate some of the features of methods, systems, and apparatuses for implementing filtering of data center power load transients caused by AI workloads, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

FIG. 1 depicts an example system 100 for implementing filtering of data center power load transients caused by AI workloads. System 100 includes a data center 105, which includes a plurality of cells 110*a*-110*k* (collectively, "cells 110"). Within each cell 110 in data center 105, system 100 further includes a plurality of rows of racks 1 through M 115*a*-115*m* (collectively, "rows of racks 115" or "rows 115). Each row of racks 115 includes equipment racks 1 through N 120*a*-120*n* (collectively, "equipment racks 120" or "racks 120"). On each rack 120 is a plurality of shelves 125*a*-1250. On each shelf 125 is a plurality of compute nodes 130*a*-130*p* (collectively, "compute nodes 130"). Each compute node 130 includes at least one of one or more AI accelerators and/or one or more GPUs. The one or more AI accelerators are used to run AI workloads (including AI training workloads, and in some cases, AI inferencing workloads as well), while the one or more GPUs are used to run general compute workloads (e.g., non-AI workloads). System 100 further includes a workload orchestrator 135, which includes a rack/row controller system 140, an AI workload scheduler 145, and a non-AI workload scheduler 150. As used herein, "non-AI workloads" refer to workloads performed predominantly by central processing units ("CPUs") or other processors that are not AI workloads and that do not require large amounts of power (at least in the aggregate), while "non-AI compute racks" (e.g., non-AI systems) refer to compute racks (or systems) including such CPUs or other processors.

With reference to FIG. 1, electrical utility station 155 provides high voltage electrical power (e.g., about 115 to about 500 kilovolt alternating current ($kV_{AC}$)) to a local electrical power grid 155*a* (capable of handling up to about 500 $kV_{AC}$), via one or more high voltage power lines 160*a*, and the local electrical power grid 155*a* provides high voltage electrical power to power transformer 155*b* via high voltage power line 160*b*. Power transformer 155*b*, which is external to data center 105, transforms (or steps down) the high voltage electrical power to medium voltage electrical power (e.g., about 2.4 to about 69 $kV_{AC}$), which is provided to power transformer 155*c* via medium voltage power line 160*c*. Power transformer 155*c*, which is located within data center 105, further transforms (or steps down) the medium voltage electrical power to low voltage power (e.g., about 240 to about 600 volt alternating current (VAC)), which is provided to each of one or more power distribution units ("PDUs") 165*a*-165*k* (collectively, "PDUs 165") via low voltage power lines 160*d*. In examples, each PDU 165 distributes electrical power to the plurality of equipment racks 120*a*-120*n* within each of the plurality of rows of racks 115*a*-115*m* in one of the cells 110, via power cables 160*e*, and thus also provides electrical power to each of the compute nodes 130 that is disposed on one of the equipment racks 120, via rack-mounted power bars or other power supplies on that equipment rack 120.

A power meter(s) 170 is used to measure power draw by each of one or more of the PDUs 165 (e.g., at least a combined power draw by at least the first plurality of compute nodes on which the AI accelerators are running AI workloads and the second plurality of compute nodes on which the GPUs are running general workloads) and/or power draw by the data center 105 as a whole. In examples, the power meter(s) 170 measures the combined power draw in one of a continuous, real-time manner or a periodic, near-real-time manner. The power meter(s) sends the power readings to the workload orchestrator 135 (e.g., to rack/row controller system 140), via connecting line 180*a*. In FIG. 1, high voltage power lines 160*a* and 160*b* are depicted by thick connecting lines, while medium voltage power line 160*c* is depicted by a medium thickness connecting line, and low voltage power lines 160*d* and power cables 160*e* are depicted by less thick connecting lines. In contrast, data connections shown in FIG. 1 are depicted by thin connecting lines. In an example, for a data center 105 having four cells 110 (e.g., k=4 in the example of FIG. 1), the data center receives a 9.6 MW input AC power feed and each PDU 165 feeds a corresponding cell 110 with 2.4 MW of power. With eight rows 115 per cells and ten racks 120, each row 115 is fed with 300 kW of power, and each rack 120 is fed with 30 kW of power.

Referring back to FIG. 1, workload orchestrator 135 interacts with each row of racks 115*a*-115*m* in each of the one or more cells 110*a*-110*k*, as depicted by connecting lines 175. In an example, the rack/row controller system 140 of the workload orchestrator 135 allocates one or more first racks 120 and/or one or more first rows 115 in one or more cells 110 for AI workloads and allocates one or more second racks 120 and/or one or more second rows 115 in one or more cells 110 for the general workloads. The AI workload scheduler 145 of the workload orchestrator 135 schedules AI workloads for AI accelerators on each of a first plurality of compute nodes on the allocated one or more first racks 120 and/or one or more first rows 115 to execute. Similarly, the non-AI workload scheduler 150 of the workload orchestrator 135 schedules general workloads for GPUs on each of a second plurality of compute nodes on the allocated one or more second racks 120 and/or one or more second rows 115 to execute.

In some examples, the AI workload scheduler 145 computes an estimated maximum power draw for the first plurality of compute nodes during a compute phase (when AI workloads are being run), computes an estimated minimum power draw for the first plurality of compute nodes during a communication phase (when AI data is being exchanged among the first plurality of compute nodes and/or the AI accelerators on these compute nodes), selects a power threshold value between the estimated maximum power draw and the estimated minimum power draw, and sends the estimated maximum power draw, the estimated minimum power draw, and the power threshold value to the rack/row controller system 140. The rack/row controller system 140 computes and sends an absorption power value to a power capper 185 (via connecting line 180*b*). The power capper 185 sends control signals to each of the one or more PDUs 165*a*-165*k*, via connecting lines 180*c*, to control power that is distributed (via power cables 160*e*) separately to each of (1) the one or more first racks 120 and/or one or more first rows 115 and (2) the one or more second racks 120 and/or one or more second rows 115. In some examples, the absorption power value corresponds to a difference between the power threshold value and the estimated minimum power draw. Alternatively or additionally, the absorption power value corresponds to a maximum power draw that the one or more second racks 120 and/or one or more second rows 115 should use during the communication phase to minimize a difference between a first overall power draw by the first plurality of compute nodes and the second plurality of compute nodes during the compute phase and a second overall power draw by the first plurality of compute nodes and the second plurality of compute nodes during the communication phase. The importance of minimizing this difference is highlighted with respect to FIGS. 2A-2C below.

System further includes servers and/or devices 190*a*-190*s* that communicatively couple with workload orchestrator 135 via network(s) 195. In some examples, servers and/or devices 190*a*-190*s* provide instructions, requests, and/or initial data for running the AI workloads and/or the general compute workloads. Results of the AI workloads and/or results of the general compute workloads are sent back by the workload orchestrator 135 to the requesting/instructing server or device among the servers and/or devices 190*a*-190*s*. In some examples, servers and/or devices 190*a*-190*s* include server computers, compute nodes, desktop computers, laptop computers, smart phone, and/or an AI system. Herein, k, M or m, Nor n, o, p, and s are non-negative integer numbers that may be either all the same as each other, all different from each other, or some combination of same and different (e.g., one set of two or more having the same values with the others having different values, a plurality of sets of two or more having the same value with the others having different values). Network(s) 195 may each include at least one of a distributed computing network, such as the Internet, a private network, a commercial network, or a cloud network, and/or the like.

In examples, AI workloads include training AI systems and/or AI models, in some cases, using large amounts of training data. In some examples, the AI systems include generative AI and/or machine learning ("ML") models such as small language models ("SLMs"), large language models ("LLMs"), or other language models. Alternatively or additionally, the AI systems include other ML models that are non-LLM models or non-language models, the other ML models including convolutional neural networks ("CNNs"), recurrent neural networks ("RNNs"), deep neural networks ("DNNs"), transformers, and/or long short-term memory networks ("LSTMs"). As used herein, an LLM refers to a machine learning model that is trained and fine-tuned on a large corpus of media (e.g., text, audio, video, or software code), and that can be accessed and used through an application programming interface ("API") or a platform. An SLM is similar to an LLM, except that it has fewer parameters and requires less data and time to be trained. An SLM and an LLM each performs a variety of tasks, including generating and classifying media, answering user requests and questions in a conversational manner, and translating text from one language to another. Examples of LLMs (or more generally language models ("LMs")) include Bidirectional Encoder Representations from Transformers ("BERT"), Word2Vec, Global and Vectors ("GloVe"), Embeddings from Language Models ("ELMo"), XLNet, Generative Pre-trained Transformer ("GPT")-3 or GPT-4, Large Language Model Meta AI ("LLaMA") 2, or BigScience Large Open-science Open-access Multilingual Language Model (BLOOM). In examples, the other ML models include multimodal models that are capable of cither one or more of text, image, audio, or video as both input and output, or using one or a first combination of text, image, audio, and/or video as input and using another or a second combination of text, image, audio, and/or video as output. Examples of multimodal models include GPT-4 (which can use both text and image as inputs), LLAMA 2 (which allows for image and video inputs), or Gemini (which was designed to process text, images, audio, video, and computer code).

In operation, workload orchestrator 135 and/or rack/row controller system 140 may perform methods for implementing filtering of data center power load transients caused by AI workloads, as described in detail with respect to FIGS. 2D-5B. For example, example graphical diagrams 200A-200C as described below with respect to FIGS. 2A-2C show power draw caused by different example AI workloads and at different levels (e.g., rack level or data center level), while example graphical diagram 200D shows filtered power draw in accordance with the techniques described herein. Further, end-to-end power orchestration flows 300A and 300B as described with respect to FIGS. 3A and 3B, example sequence flow 400 as described with respect to FIG. 4, and example methods 500A and 500B as described with respect to FIGS. 5A and 5B may be applied with respect to the operations of system 100 of FIG. 1.

Figure 2A:
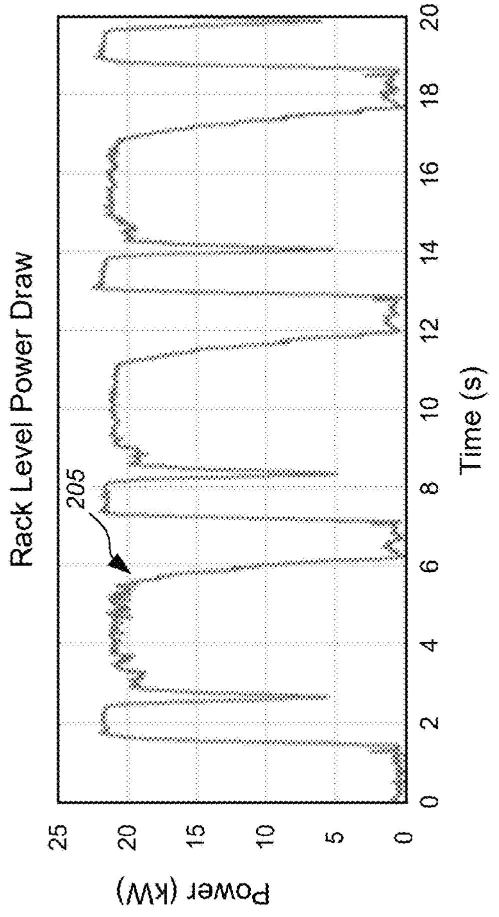
FIGS. 2A-2C depict example graphical diagrams illustrating power draw by AI workloads at a rack level and at a data center level, necessitating filtering of data center power load transients using the example system of FIG. 1.
Figure 2B:
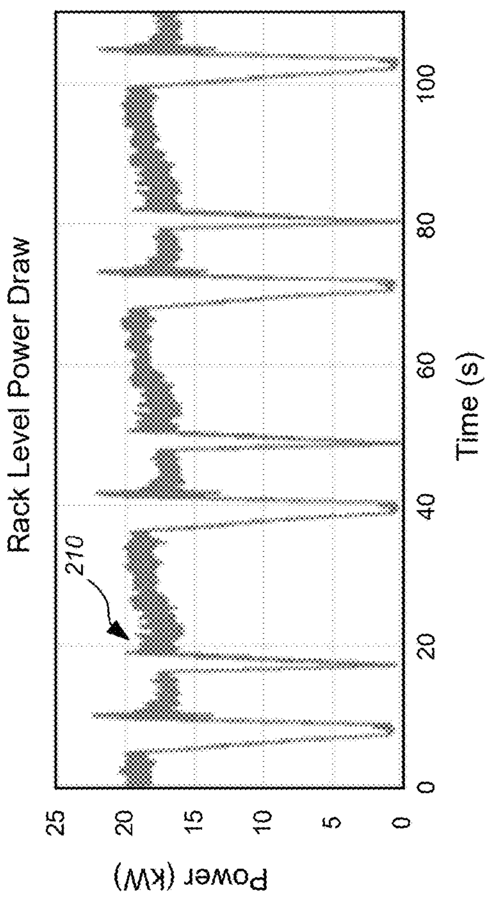
Figure 2C:
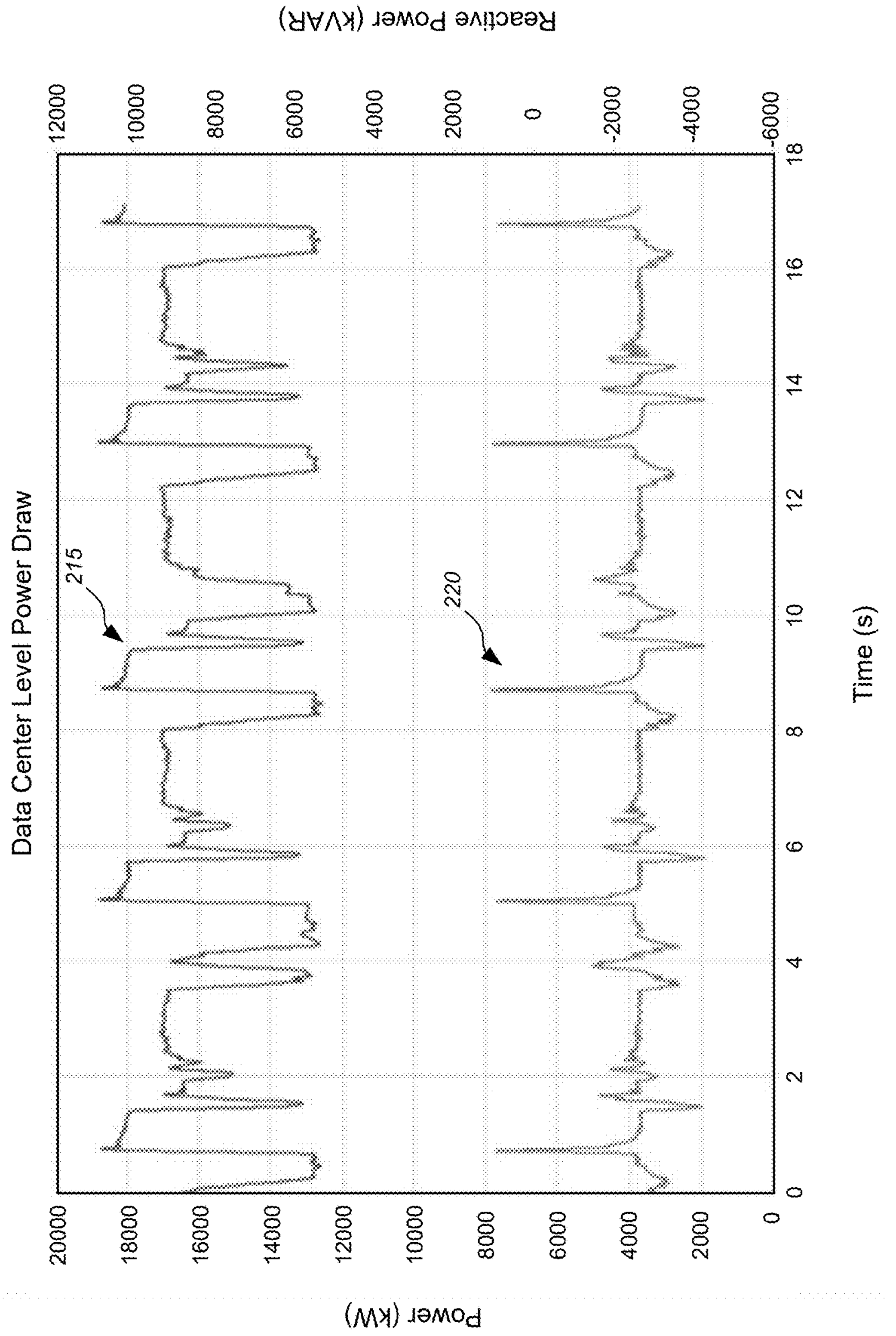

FIGS. 2A-2C depict example graphical diagrams 200A-200C illustrating power draw by AI workloads at a rack level and at a data center level, necessitating filtering of data center power load transients using the example system of FIG. 1. The example graphical diagrams 200A-200C shown in FIGS. 2A-2C depict example energy profiles 205-215, respectively, that are representative of a typical AI workload run, and depict the types of power values that are drawn by equipment racks running an AI workload. As shown in FIGS. 2A-2C, the power draw is periodic in nature.

FIG. 2A depicts the energy profile 205 for an example AI workload being performed by a single rack. The energy profile 205 has a period of about 5.79 seconds. FIG. 2B depicts the energy profile 210 for a different example AI workload being performed also by a single rack. The energy profile 210 has a period of about 34.56 seconds. As illustrated by FIGS. 2A and 2B, although the period may differ, due to the computational requirements of the AI workloads during the compute phase (and also due to the amount of AI data to be exchanged during the communication phase), the maximum and minimum power draws are approximately the same. FIG. 2C depicts the energy profile 215 for yet another example AI workload being performed by a plurality of racks in a data center, including power drawn by other equipment (e.g., power supplies, switches, routers, gateway devices, cooling equipment, and/or measurement equipment) in the data center. FIG. 2C also depicts the corresponding reactive power 220, measured in kilovolt-ampere reactive (kVAr or kVAR), which refers to the instantaneous reactive power in an electrical system and represents the amount of power that is exchanged between an energy source (in this case, electrical power grid) and a piece of equipment (in this case, equipment in the data center) due to the presence of reactive components, such as inductors and capacitors, in the consumption of electricity.

As shown in FIGS. 2A and 2B, the power draw at the rack level hovers around 20 kW during the compute phase (or the ON period), and drops to almost 0 kW during the communication phase (or the OFF period), where it stays for about 1 second, before the cycle repeats. With hundreds or thousands of these racks running synchronously, the power draw for an entire data center increases proportionately. For example, as shown in the example energy profile 215 of FIG. 2C, with about 1000 racks running synchronously, the maximum power draw for the data center, which includes power draw from other components in the data center in addition to the equipment racks (and their corresponding components), is about 18.8 MW, while the minimum power draw is about 12.8 MW. The power swing from about 18.8 MW to about 12.8 MW is sharp and occurs within a very short span of about 100 milliseconds (or less). Such rapid swings in power, especially at such high frequencies (in this case, 1 cycle every 4 seconds or so, or about 0.25 Hz) put huge strains on the electrical grid, which is ill-suited to supply power with such power ramps, and can create oscillations inside the electrical grid and/or inside the electrical lines. Power oscillations in the electrical grid can also damage mechanical and electrical equipment that are used to supply the electrical power. The present technology, as described with respect to FIGS. 1, 2D, 3A, 3B, 4, 5A, and 5B addresses these rapid swings in power caused by the AI workloads, without wasting energy running dummy workloads during the communication phase and without incurring additional costs with the use of typically expensive large capacitor-based energy storage solutions (or other similar energy storage solutions).

Figure 2D:
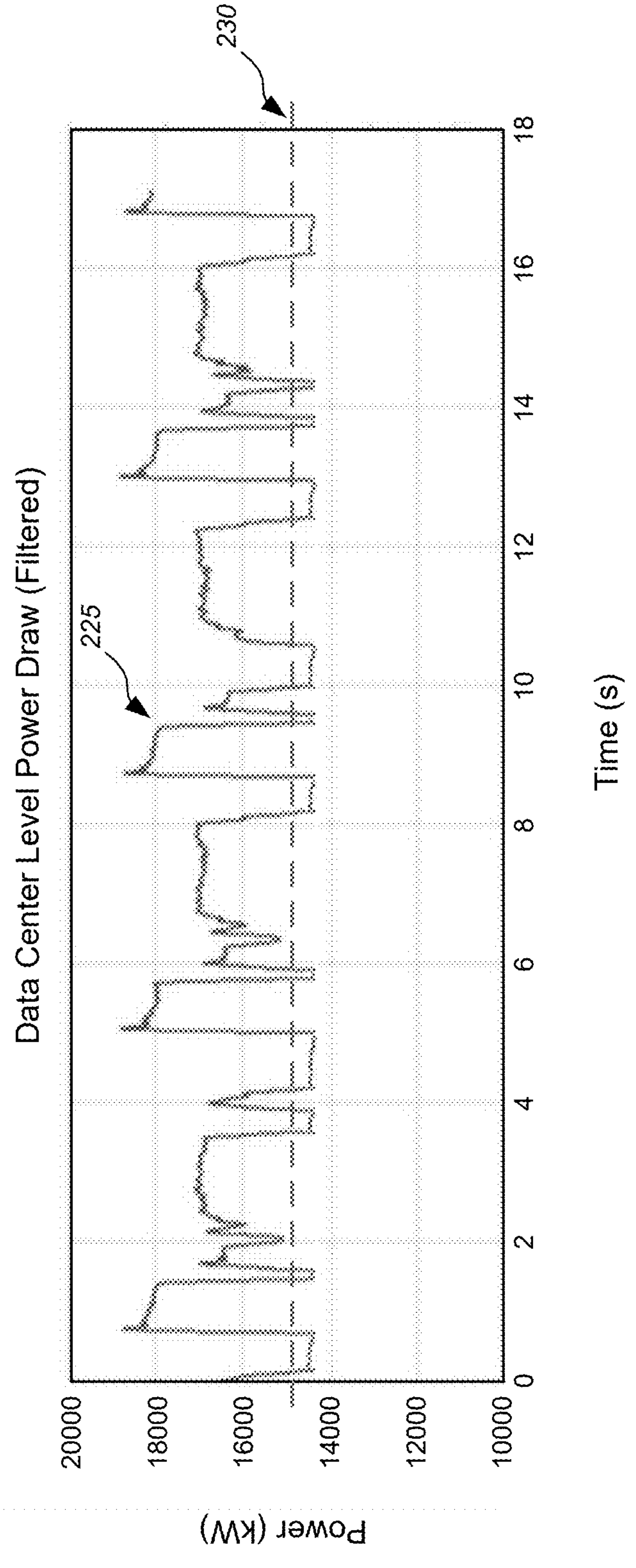
FIG. 2D depicts an example graphical diagram illustrating power draw at a data center level where power load transients have been filtered.

FIG. 2D depicts an example graphical diagram 200D illustrating power draw at a data center level where power load transients have been filtered. Instead of running dummy workloads during the communication phase, or using expensive energy storage systems (e.g., energy storage capacitors or other energy storage systems), either some racks in a row of racks or some rows of racks are assigned to handle general compute workloads, while the remaining racks in the row or the remaining rows of racks are assigned AI workloads. With a maximum power draw (e.g., AI workload power draw during compute phase) of about 18.8 MW and a minimum power draw (e.g., AI workload power draw during communication phase) of about 12.8 MW for the energy profile 215 of FIG. 2C, a total power swing, which is calculated by subtracting the minimum power draw from the maximum power draw, is about 6 MW. Selecting a Power Floor to be about 80% of the maximum power draw, one obtains a Power Floor value of about 15 MW and an absorption power value, which is calculated by subtracting the minimum power draw from the Power Floor value, of about 2.2 MW. Referring to FIG. 2D, the Power Floor (or power threshold value) is depicted by the dashed line 230. When the power draw rises above the Power Floor (indicating that the compute phase of the AI workload is starting), power feeding the row of racks for the non-AI or general compute workloads is throttled, after which the row of racks for the non-AI or general compute workloads continue to operate, but draw very little power. When the power draw drops below the Power Floor (indicating that the communication phase of the AI workload is starting), power feeding the row of racks for the non-AI or general compute workloads is unthrottled, but capped at the absorption power value as the maximum power draw for the row of racks for the non-AI or general compute workloads. In this manner, (as shown in FIG. 2D) the data center power draw, after filtering, is prevented from swinging sharply at the full swing (in this case, a full swing of 6 MW) while also being prevented from exceeding the Power Floor due to non-AI or general compute workloads. Only the AI workloads transitioning into the compute phase will cause the data center power draw to rise above the Power Floor. The process for implementing such filtering is described in greater detail below with respect to FIGS. 3A-4.

Figure 3A:
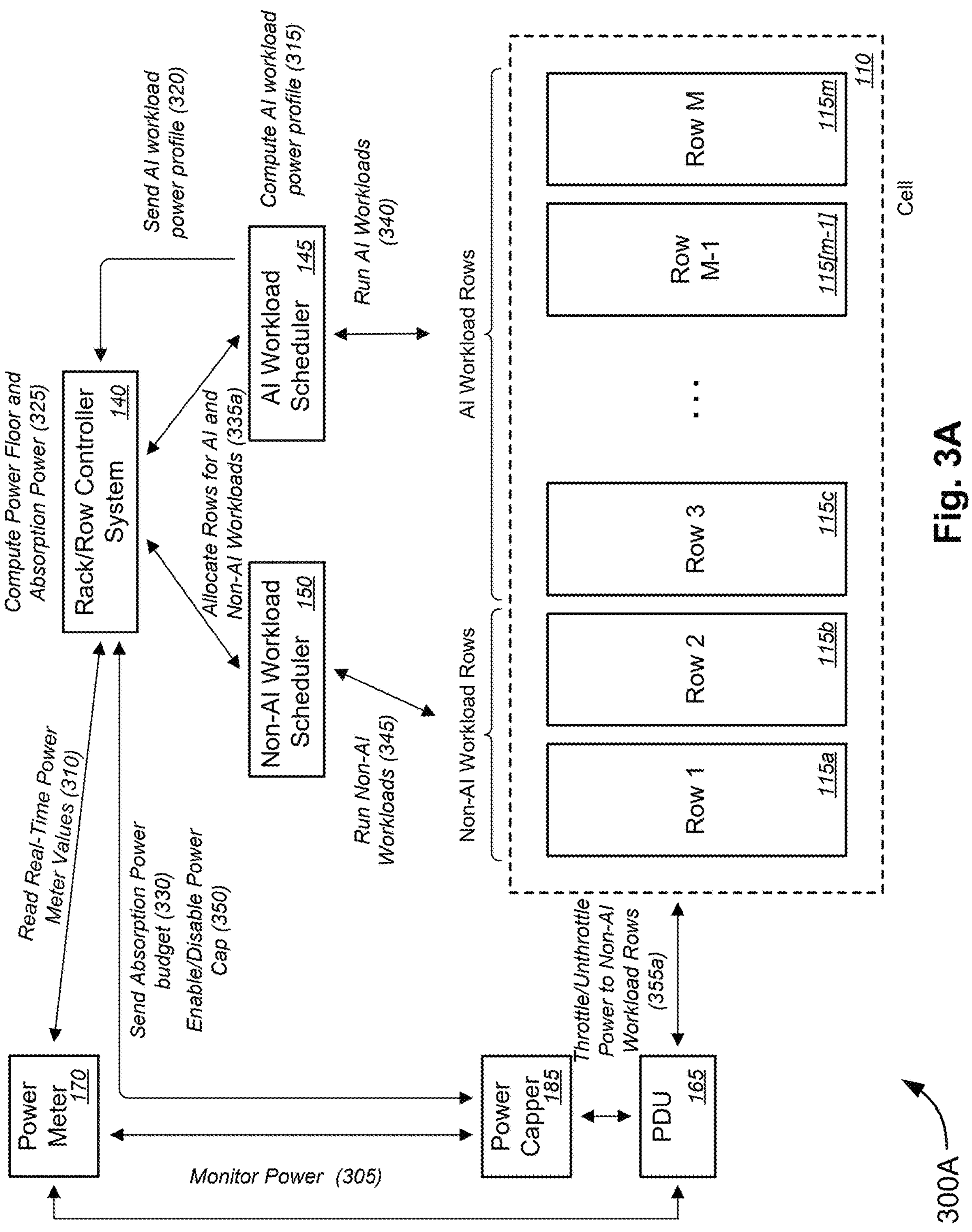
FIGS. 3A and 3B depict example block flow diagrams illustrating end-to-end power orchestration flows when implementing filtering of data center power load transients caused by AI workloads.
Figure 3B:
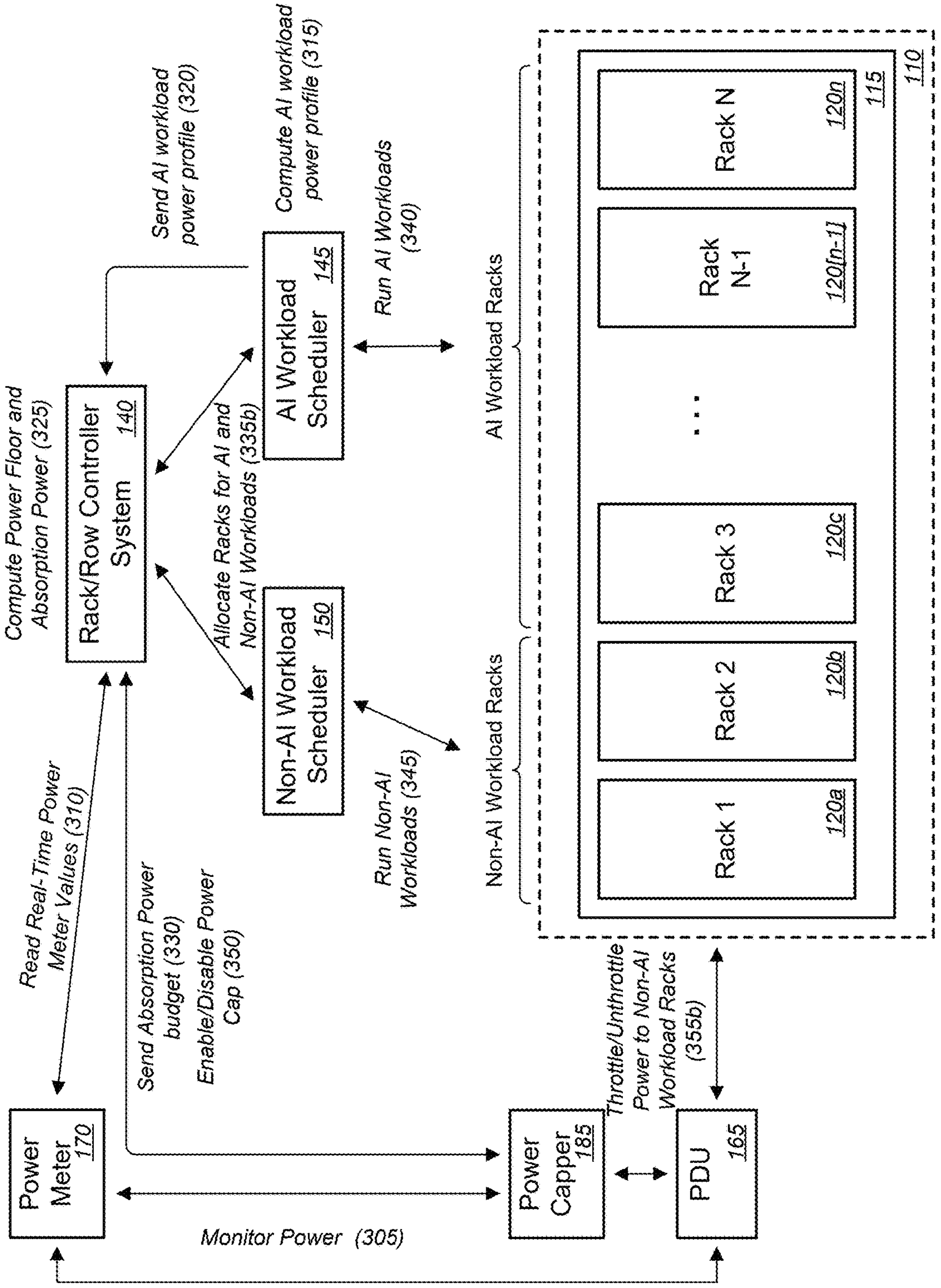

FIGS. 3A and 3B depict example block flow diagrams illustrating end-to-end power orchestration flows 300A and 300B when implementing filtering of data center power load transients caused by AI workloads. In particular, the end-to-end power orchestration flows 300A and 300B illustrate a power sharing implementation between AI and non-AI racks/rows in the data center. Some percentage of racks or rows in the data center is allocated to host compute nodes having GPUs executing non-AI general compute workloads (e.g., non-critical and/or flexible Service Level Agreement ("SLA") compute workloads), while the remaining percentage of racks or rows in the data center is allocated to host compute nodes having AI accelerators executing AI compute workloads (e.g., AI training workloads and, in some cases, AI inferencing workloads as well). In examples, an AI workload scheduler (e.g., AI workload scheduler 145 of FIG. 1) computes workload parameters including maximum and minimum power draw caused by AI workloads during ON time (or compute phase) and during OFF time (or communication phase), as well as ON/OFF duty cycle. These workload parameters are communicated to the data center fabric services (e.g., the rack/row controller 140). The data center fabric services calculate and set a power threshold value (or Power Floor), which serves as a trigger for enabling or disabling power throttling for the racks and/or rows used for running the non-AI general compute workloads. From the perspective of the electrical utility, the power consumption of the data center does not sharply fall far below the Power Floor. This Power Floor also provides the power swing that is required to be absorbed during AI OFF times. An absorption power value is calculated by subtracting the minimum workload power from the Power Floor. Table 1 below provides an example of power swing estimation.

TABLE 1

An example of power swing estimation

| | |
|---|---|
| Cell (or PDU) power capacity | 2400 kW |
| Max power consumed by AI workload (Compute/ON period) | 2000 kW |
| Min power consumed by AI workload (Communication/ OFF period) | 1200 kW |
| Total power swing expected (Max - Min Power) | 800 kW |
| Power Floor - 75% of Max Power | 0.75 × 2000 = 1500 kW |
| Absorption Power (Power Floor - Min Power) | 1500 − 1200 = 300 kW |

In the example of Table 1, a total power swing is calculated to be 800 kW, by subtracting a minimum power consumed by the AI workloads during the communication phase (or OFF period) (in this case, 1200 kW) from a maximum power consumed by AI workloads during the compute phase (or ON period) (in this case, 2000 kW). Using a Power Floor of 75% of the maximum power consumed by AI workloads during the compute phase, and with a minimum power consumed by the AI workloads during the communication phase, an absorption power value is calculated to be 300 kW. The data center fabric services communicates the absorption power value as a maximum power budget to the non-AI workload scheduler, which uses the absorption power value to set a power cap limit on the non-AI racks and/or rows. Initially, all the non-AI racks and/or rows are power throttled by the power capper, and will run at the lowest feasible power (e.g., minimal operational power level, referred to herein as a first operational power level; note that it is not shut down completely, because restarting takes time, which defeats the purpose of fast switching of power distribution; instead all the non-AI racks and/or rows continue to operate, but draw very little power).

At this time, the AI workloads are launched on the AI racks and/or rows. A data center power meter (e.g., power meter 170) measures or computes the power consumed by the AI racks and/or rows in real-time. During the AI workload transition from ON to OFF cycle, the power meter dynamically detects when rack/row power goes below Power Floor value (e.g., 75% of Max power). The power meter signals to the power capper, which sends a control plane message to disable power throttling on the non-AI racks and/or rows. The power on these non-AI racks and/or rows is allowed to go up to the absorption value pre-set by the power capper. This allows the entire data center power to be maintained at or below the Power Floor value during the OFF cycle. During AI workload transition from OFF cycle to ON cycle, the power meter detects when AI rack/row power goes above Power Floor value, and signals to the power capper, which will send a message to engage Power Throttling to the non-AI racks/rows. This allows the absorption power budget to be transferred back to the AI racks and/or rows for the ON cycle. The communication between the various fabric services—data center power meter service, rack/row controller service, and power capper—is required to be a fast path in the order of less than a second (e.g., 10*s* of milliseconds). This is required to quickly enable and disable Power Throttling to the Non-AI racks and/or rows. The fast path, for instance, includes at least one of a dedicated 1 gigabit/s (Gbps) line, a low latency path, a dedicated bus line, a regular Ethernet fabric, a point-to-point non-shared line, and/or a shared message line that connects the racks and/or rows with the PDU and/or power meter, and/or connects the various data center fabric services (e.g., data center power meter service, rack/row controller service, and power capper) together.

In some embodiments, with reference to FIGS. 3A and 3B, cell 110, rows 115 and 115*a*-115*m*, racks 120*a*-120*n*, rack/row controller system 140, AI workload scheduler 145, non-AI workload scheduler 150, PDU 165, power meter 170, and power capper 185 of FIGS. 3A and 3B may be similar, if not identical, to the cells 110*a*-110*k*, the plurality of rows of racks 115*a*-115*m*, the plurality of equipment racks 120*a*-120*n*, the rack/row controller system 140, the AI workload scheduler 145, the non-AI workload scheduler 150, the one or more PDUs 170, the power meter 170, and the power capper 185, respectively, of system 100 of FIG. 1, and the description of these components of system 100 of FIG. 1 are similarly applicable to the corresponding components of end-to-end power orchestration flows 300A or 300B of FIG. 3A or 3B. Although the operations below are described in a particular other, other order or sequence may be implemented for end-to-end power orchestration flows 300A and 300B. FIGS. 3A and 3B are identical, except that rows of racks are allocated for non-AI and AI workloads and power to rows of racks allocated to non-AI workloads are throttled or unthrottled (in FIG. 3A) while racks within a particular row are allocated for non-AI and AI workloads and power to racks allocated to non-AI workloads are throttled or unthrottled (in FIG. 3B).

Referring to FIGS. 3A and 3B, at operation 305, the power meter 170 continually monitors power draw by the rows 115*a*-115*m* in the cell 110, as provided by the PDU 165 and/or capped or throttled by the power capper 185. At operation 310, the rack/row controller system 140 reads power meter values from the power meter 170, either continuously in real-time (on the order of milliseconds, 10 s or milliseconds, or hundreds of milliseconds, but less than a second) or periodically in near-real-time (on the order of one or a few seconds). At operation 315, the AI workload scheduler 145 computes an AI workload power profile, and sends the AI workload power profile to the rack/row controller system 140 (at operation 320). At operation 325, the rack/row controller system 140 computes a Power Floor value and an absorption power value (each of which is described in detail above). At operation 330, the rack/row controller system 140 sends the absorption power budget (based on the absorption power value) to the power capper 185. At operation 335*a* (as shown in FIG. 3A), the rack/row controller system 140 allocates rows of racks for AI and non-AI workloads (in this case, rows 1 and 2 115*a*-115*b* for non-AI workloads and rows 3 to M 115*c*-115*m* for AI workloads). Alternatively, at operation 335*b* (as shown in FIG. 3B), the rack/row controller system 140 allocates racks in a particular row for AI and non-AI workloads (in this case, racks 1 and 2 120*a*-120*b* in row 115 for non-AI workloads and racks 3 to N 120*c*-120*n* in row 115 for AI workloads).

At operation 340, AI workload scheduler 145 runs AI workloads on the AI workload rows 3 to M 115*c*-115*m* (as shown in FIG. 3A) or on the AI workload racks 3 to N 120*c*-120*n* in row 115 (as shown in FIG. 3B). At operation 345, non-AI workload scheduler 150 runs non-AI workloads on the non-AI workload rows 1 and 2 115*a*-115*b* (as shown in FIG. 3A) or on the non-AI workload racks 1 and 2 120*a*-120*b* in row 115 (as shown in FIG. 3B). At operation 350, based on the power meter reading indicating power draw rising above/falling below the Power Floor value, the rack/row controller system 140 signals or instructs the power capper 185 to enable/disable the power cap and power throttling on the non-AI workload rows and/or racks, and the power capper 185 causes the PDU 165 to throttle/unthrottle the power fed to the non-AI workload rows 1 and 2 115*a*-115*b* (at operation 355*a* as shown in FIG. 3A) or on the non-AI workload racks 1 and 2 120*a*-120*b* in row 115 (at operation 355*b* as shown in FIG. 3B).

Figure 4:
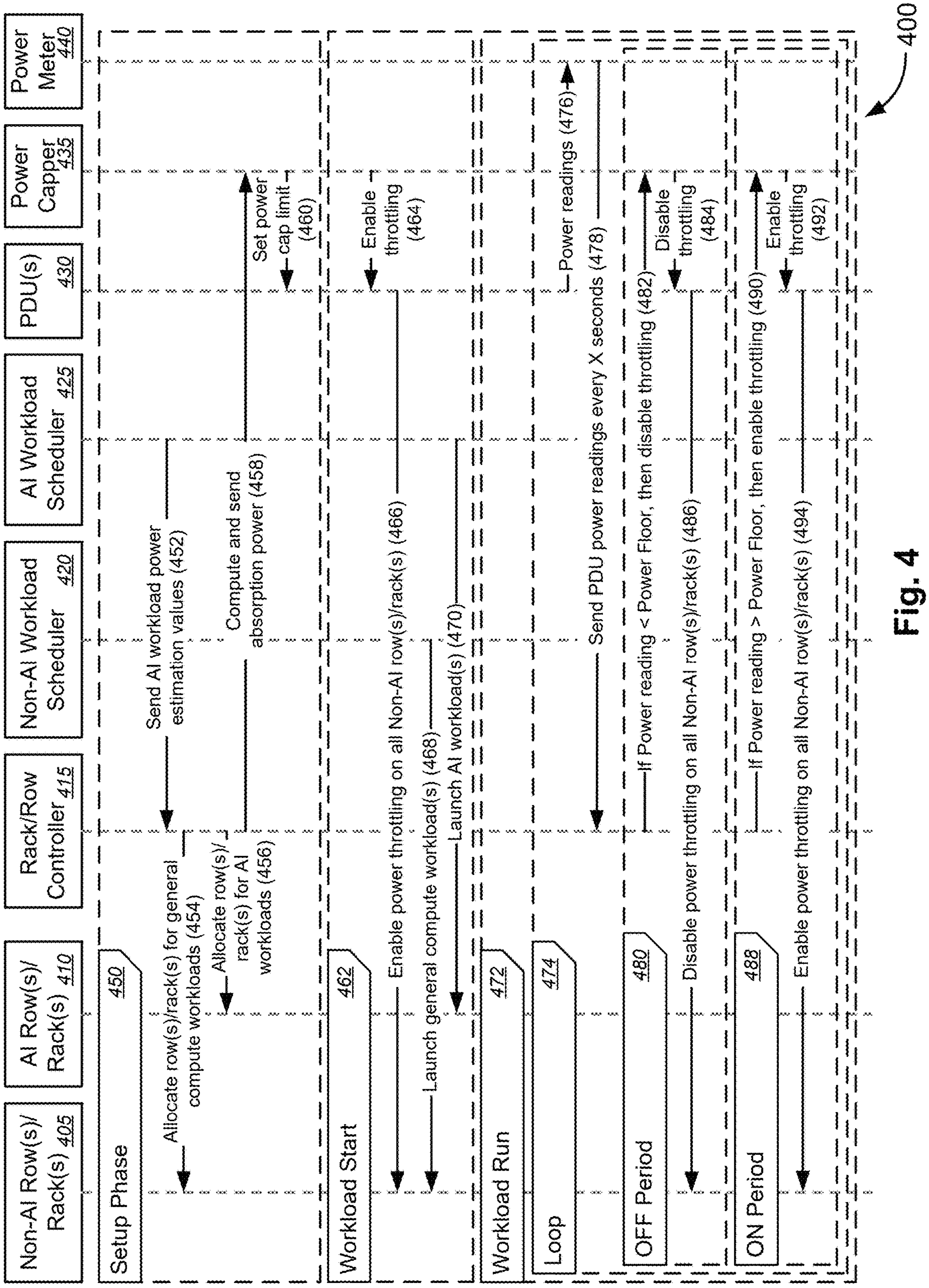
FIG. 4 depicts an example sequence flow for implementing filtering of data center power load transients caused by AI workloads.

FIG. 4 depicts an example sequence flow 400 for implementing filtering of data center power load transients caused by AI workloads. In FIG. 4, rack/row controller 415 interacts with non-AI row(s) and/or rack(s) 405, AI row(s) and/or rack(s) 410, power capper 435, and power meter 440, while the power capper 435 interacts with PDU(s) 430, which controls power distributed to the non-AI row(s) and/or rack(s) 405 and to the AI row(s) and/or rack(s) 410. Non-AI workload scheduler 420 schedules general compute workloads on the non-AI row(s) and/or rack(s) 405, while AI workload scheduler 425 schedules AI workloads on the AI row(s) and/or rack(s) 410. In some embodiments, non-AI row(s) and/or rack(s) 405, AI row(s) and/or rack(s) 410, rack/row controller 415, non-AI workload scheduler 420, AI workload scheduler 425, PDU(s) 430, power capper 435, and power meter 440 of FIG. 4 may be similar, if not identical, to the rows 115*a* and 115*b* or racks 120*a* and 120*b*, rows 115*c*-115*m* or racks 120*c*-120*n*, rack/row controller system 140, non-AI workload scheduler 150, AI workload scheduler 145, PDU 165, power capper 185, and power meter 170, respectively, of end-to-end power orchestration flows 300A or 300B of FIG. 3A or 3B, and the description of these components of end-to-end power orchestration flows 300A or 300B of FIG. 3A or 3B are similarly applicable to the corresponding components of FIG. 4.

During a setup phase 450, the AI workload scheduler 425 sends AI workload power estimation values to the rack/row controller 415 (at operation 452). In examples, the AI workload power estimation values include an estimated maximum power draw for a plurality of compute nodes performing AI workloads during a compute phase, an estimated minimum power draw for the plurality of compute nodes during a communication phase, a power threshold value selected between the estimated maximum power draw and the estimated minimum power draw (e.g., 75%, 80%, 85%, or 90% of the maximum power draw). The rack/row controller 415 allocates non-AI row(s) and/or rack(s) 405 for general compute workloads (at operation 454) and allocates AI row(s) and/or rack(s) 410 for AI workloads (at operation 456), in some cases, based on the AI workload power estimation values. At operation 458, the rack/row controller 415 computes an absorption power value based on a difference between the power threshold value and the minimum power, and sends the absorption power value to power capper 435, which sets a power cap limit on the non-AI row(s) and/or rack(s) 405 via the PDU(s) 430. That is, the rack/row controller 415 instructs the power capper 435 to set a maximum power consumption by the non-AI row(s) and/or rack(s) 405 to the absorption power value, such that a sum of the maximum power consumption (i.e., the absorption power) of the non-AI row(s) and/or rack(s) 405 and the minimum power draw of the AI row(s) and/or rack(s) 410 during the communication phase (or OFF period) does not exceed the power threshold value (or Power Floor). Alternatively, in other examples, the rack/row controller 415 determines the number of non-AI row(s) and/or rack(s) 405, when unthrottled to a second operational power level, that draws power equivalent to the absorption power, in which case, computation of the absorption power (at operation 458) occurs before allocation of the non-AI row(s) and/or rack(s) 405 for general compute workloads (at operation 454). In such cases, the power cap at the absorption power value is used as a backup measure or is obviated.

During a workload start 462, the power capper 435 enables power throttling on all non-AI row(s) and/or rack(s) 405, via PDU(s) 430 (at operations 464 and 466), which sets the non-AI row(s) and/or rack(s) 405 at a first operational power level at which there is sufficient power to maintain an ON state (while obviating a restart, which can take time to perform), and sufficient power to continue running compute workloads, but at very low power. At operation 468, the non-AI workload scheduler 420 launches general compute workload(s) on the non-AI row(s) and/or rack(s) 405. However, as power throttling is enabled, the general compute workload(s) is (are) queued, but not run, until power throttling has been disabled. At operation 470, the AI workload scheduler 425 launches an AI workload(s) on the AI row(s) and/or rack(s) 410.

During a workload run 472, operations enter a loop 474, during which power meter 440 measures or obtains power readings from PDU(s) 430 (at operation 476) and sends the PDU power readings to the rack/row controller 415 every X seconds (at operation 478), where X is any suitable number (e.g., 1, 2, 3, 4, or 5 seconds). During an OFF period (or communication phase) 480, if the power reading is less than a Power Floor (corresponding to the power threshold value described above), then the rack/row controller 415 instructs the power capper 435 to disable throttling (at operation 482). The power capper 435 disables power throttling on all non-AI row(s) and/or rack(s) 405, via PDU(s) 430 (at operations 484 and 486), which sets the non-AI row(s) and/or rack(s) 405 at the second operational power level that is capped at the absorption power, such that the PDU(s) 430 power does not exceed the Power Floor due to the non-AI row(s) and/or rack(s) 405 performing the general compute workloads while the AI row(s) and/or rack(s) 410 exchange AI data (e.g., weights and other data) during the communication phase. During an ON period (or compute phase) 488, if the power reading is greater than the Power Floor (which is indicative of the AI row(s) and/or rack(s) 410 transitioning from exchanging AI data to perform the next set of AI workloads), then the rack/row controller 415 instructs the power capper 435 to enable throttling (at operation 490). The power capper 435 enables power throttling on all non-AI row(s) and/or rack(s) 405, via PDU(s) 430 (at operations 492 and 494), which sets the non-AI row(s) and/or rack(s) 405 at the first operational power level. The OFF period 480 and ON period 488 continue to switch back and forth until the AI workloads have been completed, at which point, the OFF period 480 is sustained until the AI workload scheduler 425 launches new AI workloads on the AI row(s) and/or rack(s) 410, and the cycle at operations 450-494 is repeated for the new AI workload(s).

In summary, the system (e.g., power meter 440) monitors the power draw for the cell(s) (via the PDU(s) 430) or for the data center as a whole, either continuously in real-time (on the order of milliseconds, 10 s or milliseconds, or hundreds of milliseconds, but less than a second) or periodically in near-real-time (on the order of one or a few seconds). The AI workload scheduler 425 estimates or determines maximum power consumed by the AI row(s) and/or rack(s) 410 during the compute phase (or ON times/period), the minimum power consumed by the AI row(s) and/or rack(s) 410 during the communication phase (or OFF times/period), and the power swing between the maximum and minimum power values, and sends these estimated values to rack/row controller 415 that computes an absorption power value based on a difference between a threshold value (e.g., 75%, 80%, 85%, or 90% of the maximum power) and the minimum power, and sends the absorption power to power capper 435. During workload start 462 and during the ON period 488, power readings of power provided by the PDU(s) to the cell(s) (including at least the non-AI row(s) and/or rack(s) 405 and the AI row(s) and/or rack(s) 410) exceed the Power Floor mainly due to the AI workload(s) being run on the AI row(s) and/or rack(s) 410. During the OFF period 480, power readings of power provided by the PDU(s) to the cell(s) (including at least the non-AI row(s) and/or rack(s) 405 and the AI row(s) and/or rack(s) 410) are capped at the Power Floor mainly either by setting a maximum power consumed by the non-AI row(s) and/or rack(s) 405 to be at the absorption power while running the general workload(s) or by estimating the number of non-AI row(s) and/or rack(s) 405 to run the general workload(s) to avoid the non-AI row(s) and/or rack(s) 405 exceeding the absorption power value while running the general workload(s). In this manner, only AI workload(s) run by the AI row(s) and/or rack(s) 410 would cause the power readings to exceed the Power Floor, and thus the Power Floor can be used as a trigger. In other words, exceeding the Power Floor triggers enabling throttling of the non-AI row(s) and/or rack(s) 405 while the AI row(s) and/or rack(s) 410 run the AI workload(s), while falling below the Power Floor triggers disabling throttling of the non-AI row(s) and/or rack(s) 405 so that the non-AI row(s) and/or rack(s) 405 can run the general workload(s) (in some cases, with a maximum power draw capped at the absorption power value), while the AI row(s) and/or rack(s) 410 exchange AI data during the communication phase.

Figure 5A:
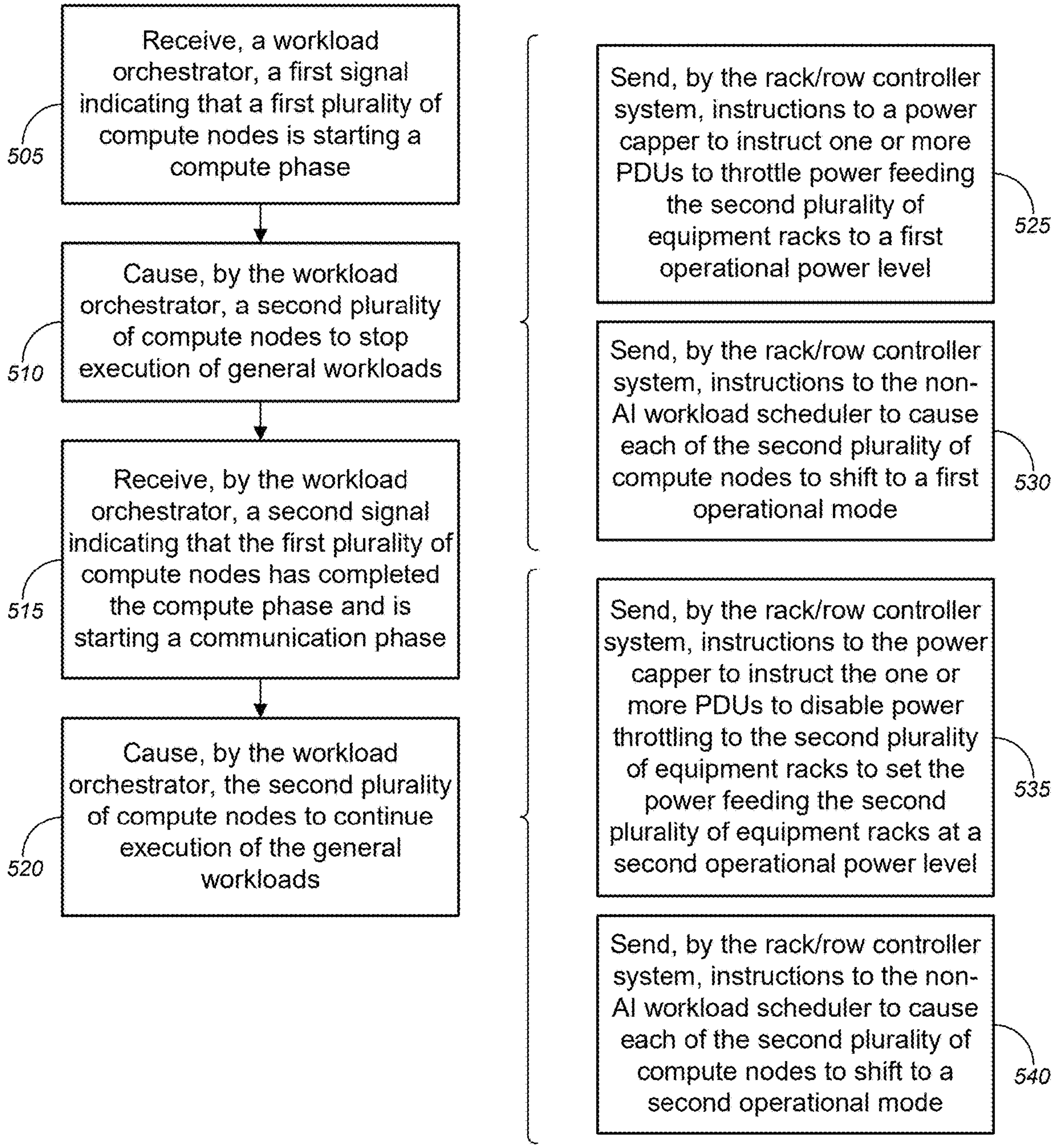
FIGS. 5A and 5B depict example methods for implementing filtering of data center power load transients caused by AI workloads.
Figure 5B:
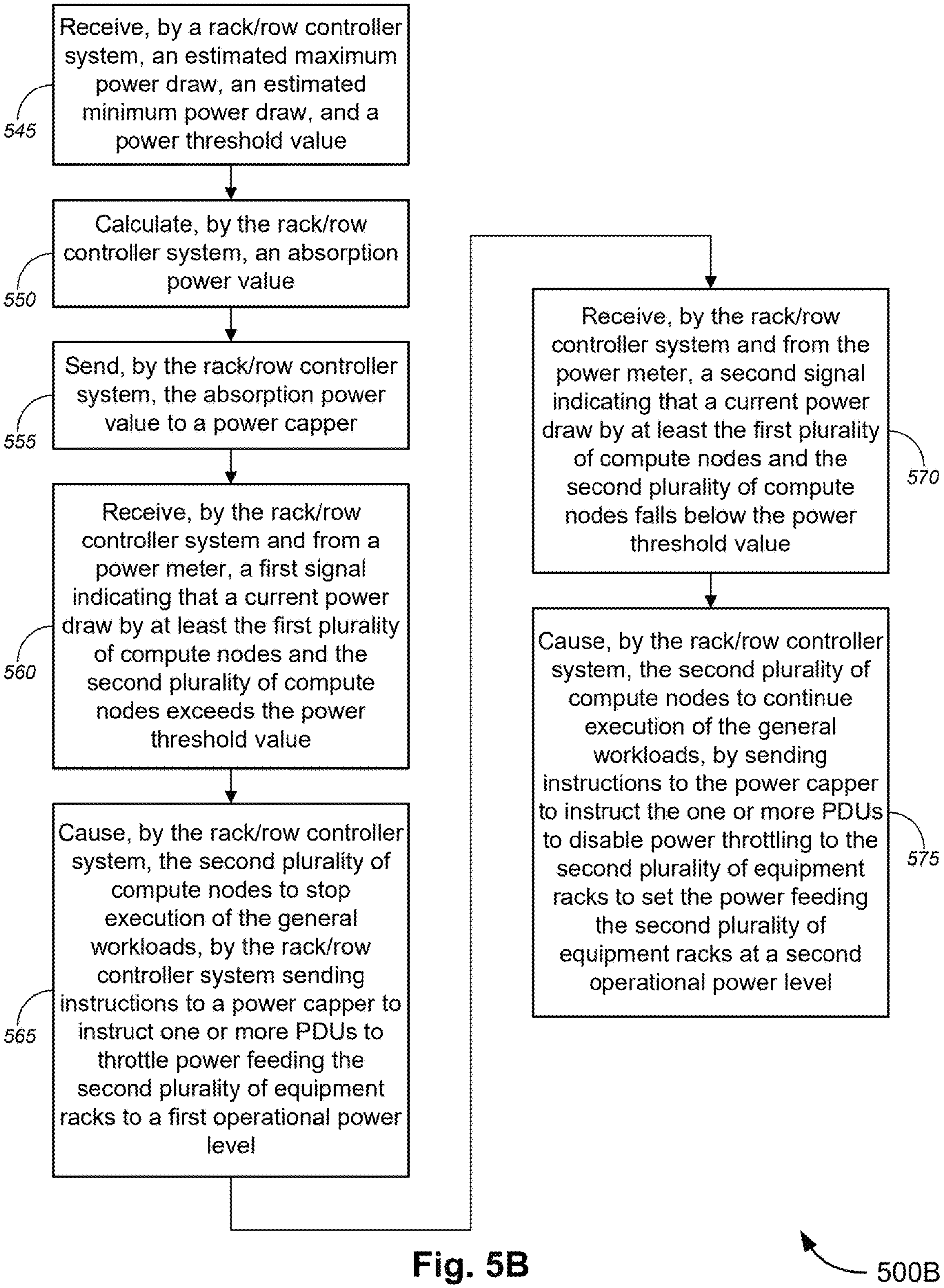

FIGS. 5A and 5B depict example methods 500A and 500B for implementing filtering of data center power load transients caused by AI workloads. In examples, the operations of example methods 500A and 500B may be performed by a workload orchestrator and/or rack/row controller system (e.g., workload orchestrator 135 of FIG. 1 and/or rack/row controller system 140 or 415 of FIGS. 1, 3A, 3B, and 4).

In the example method 500A of FIG. 5A, at operation 505, a workload orchestrator receives a first signal indicating that a first plurality of compute nodes is starting a compute phase during which AI workloads are executed by AI accelerators on the first plurality of compute nodes. At operation 510, in response to receiving the first signal, the workload orchestrator causes a second plurality of compute nodes to stop execution of general workloads (e.g., non-AI workloads). At operation 515, the workload orchestrator receives a second signal indicating that the first plurality of compute nodes has completed the compute phase and is starting a communication phase during which AI data is exchanged among the AI accelerators on the first plurality of compute nodes. At operation 520, in response to receiving the second signal, the workload orchestrator causes the second plurality of compute nodes to continue execution of the general workloads.

In examples, the workload orchestrator includes an AI workload scheduler (e.g., AI workload scheduler 145 or 425 of FIGS. 1, 3A, 3B, and 4), a non-AI workload scheduler (e.g., non-AI workload scheduler 150 or 420 of FIGS. 1, 3A, 3B, and 4), and a rack/row controller system (e.g., rack/row controller system 140 or 415 of FIGS. 1, 3A, 3B, and 4). In some instances, the AI workload scheduler schedules the AI workloads for the AI accelerators on each of the first plurality of compute nodes to execute. In some cases, the non-AI workload scheduler schedules the general workloads for GPUs on each of the second plurality of compute nodes to execute. In some examples, the rack/row controller system allocates racks and rows for the AI workloads and for the general workloads.

In an example, the first plurality of compute nodes is disposed on and electrically powered by a first plurality of equipment racks, and the second plurality of compute nodes is disposed on and electrically powered by a second plurality of equipment racks. In some instances, the first signal is sent by a power meter (e.g., power meter 170 or 440 of FIGS. 1, 3A, 3B, and 4) to the rack/row controller system. In examples, the power meter measures a combined power draw by at least the first plurality of compute nodes and the second plurality of compute nodes in one of a continuous, real-time manner or a periodic, near-real-time manner. In some cases, the first signal indicates that a current power draw by the at least the first plurality of compute nodes and the second plurality of compute nodes exceeds a power threshold value (e.g., 75%, 80%, 85%, or 90% of the maximum power), and causing the second plurality of compute nodes to stop execution of the general workloads (at operation 510) includes the rack/row controller system sending instructions to a power capper (e.g., power capper 185 or 435 of FIGS. 1, 3A, 3B, and 4) to instruct one or more PDUs (e.g., PDU(s) **165*a*-165*k*, 165, or 430 of FIGS. 1, 3A, 3B, and 4) to throttle power feeding the second plurality of equipment racks to a first operational power level (at operation 525**).

In another example, the second signal is sent by the power meter to the rack/row controller system. In some instances, the second signal indicates that a current power draw by at least the first plurality of compute nodes and the second plurality of compute nodes falls below the power threshold value, and causing the second plurality of compute nodes to continue execution of the general workloads (at operation 520) includes the rack/row controller system sending instructions to the power capper to instruct the one or more PDUs to disable power throttling to the second plurality of equipment racks to set the power feeding the second plurality of equipment racks at a second operational power level (at operation 535), which is greater than the first operational power level. In some examples, the second operational power level is capped at an absorption power value corresponding to a difference between the power threshold value and an estimated minimum power draw for the first plurality of compute nodes during the communication phase.

Alternatively, the first signal is sent by the AI workload scheduler to the rack/row controller system, and indicates that the compute phase is starting. In some instances, causing the second plurality of compute nodes to stop execution of the general workloads (at operation 510) includes the rack/row controller system sending instructions to the non-AI workload scheduler to cause each of the second plurality of compute nodes to shift to a first operational mode (at operation 530).

In another example, the second signal is sent by the AI workload scheduler to the rack/row controller system, and indicates that the communication phase is starting. In some instances, causing the second plurality of compute nodes to continue execution of the general workloads (at operation 520) includes the rack/row controller system sending instructions to the non-AI workload scheduler to cause each of the second plurality of compute nodes to shift to a second operational mode (at operation 540).

Alternatively, in the example method 500B of FIG. 5B, at operation 545, a rack/row controller system receives an estimated maximum power draw, an estimated minimum power draw, and a power threshold value. The estimated maximum power draw is computed by the AI workload scheduler for the first plurality of compute nodes during the compute phase, while the estimated minimum power draw is computed by the AI workload scheduler for the first plurality of compute nodes during the communication phase. The power threshold value is selected, by the AI workload scheduler, to be between the estimated maximum power draw (e.g., 75%, 80%, 85%, or 90% of the maximum power). At operation 550, the rack/row controller system calculates an absorption power value corresponding to a difference between the power threshold value and the estimated minimum power draw, and sends the absorption power value to the power capper (at operation 555). The absorption power value corresponds to a maximum power draw that the second plurality of equipment racks should use during the communication phase to minimize a difference between a first overall power draw by the first plurality of compute nodes and the second plurality of compute nodes during the compute phase and a second overall power draw by the first plurality of compute nodes and the second plurality of compute nodes during the communication phase.

At operation 560, the rack/row controller system receives, from the power meter, a first signal indicating that a current power draw by at least the first plurality of compute nodes and the second plurality of compute nodes exceeds a power threshold value, indicative of the first plurality of compute nodes starting a compute phase during which the AI workloads are executed by the AI accelerators on the first plurality of compute nodes. At operation 565, in response to receiving the first signal, the rack/row controller system causes the second plurality of compute nodes to stop execution of the general workloads, by the rack/row controller system sending instructions to a power capper to instruct one or more PDUs to throttle power feeding the second plurality of equipment racks to the first operational power level.

At operation 570, the rack/row controller system receives, from the power meter, a second signal indicating that a current power draw by at least the first plurality of compute nodes and the second plurality of compute nodes falls below the power threshold value, indicative of the first plurality of compute nodes having completed the compute phase and is starting a communication phase during which AI data is exchanged among the AI accelerators on the first plurality of compute nodes. At operation 575, in response to receiving the second signal, the rack/row controller system causes the second plurality of compute nodes to continue execution of the general workloads, by the rack/row controller system sending instructions to the power capper to instruct the one or more PDUs to disable power throttling to the second plurality of equipment racks to set the power feeding the second plurality of equipment racks at the second operational power level.

In examples, the rack/row controller system instructs the power capper to control the one or more PDUs to provide power to the second plurality of equipment racks such that the power draw of the second plurality of equipment racks corresponds to an absorption power value, by performing one of:

(a) determining a number of equipment racks corresponding to a power draw for performing the general workloads that matches the absorption power value, and assigning the number of equipment racks as the second plurality of equipment racks; or (b) causing the one or more PDUs to cap the second operational power level of the second plurality of equipment racks at the absorption power value.

While the techniques and procedures in methods 500A, 500B are depicted and/or described in a certain order for purposes of illustration, it should be appreciated that certain procedures may be reordered and/or omitted within the scope of various embodiments. Moreover, while the methods 500A, 500B may be implemented by or with (and, in some cases, are described below with respect to) the systems, examples, or embodiments 100, 300A, 300B, and 400 of FIGS. 1, 3A, 3B, and 4, respectively (or components thereof), such methods may also be implemented using any suitable hardware (or software) implementation. Similarly, while each of the systems, examples, or embodiments 100, 300A, 300B, and 400 of FIGS. 1, 3A, 3B, and 4, respectively (or components thereof), can operate according to the methods 500A, 500B (e.g., by executing instructions embodied on a computer readable medium), the systems, examples, or embodiments 100, 300A, 300B, and 400 of FIGS. 1, 3A, 3B, and 4 can each also operate according to other modes of operation and/or perform other suitable procedures.

As should be appreciated from the foregoing, the present technology provides multiple technical benefits and solutions to technical problems. For instance, when implementing AI training workloads in racks and/or rows in a data center, the periodic nature and synchronicity across the thousands, tens of thousands, or more compute nodes running the AI training workloads in racks in the data center, as well as the rapid switching between compute and communication phases, result in rapid power swings with high amplitude (on the order of sub-megawatts or several megawatts) and high frequency (on the order of a few seconds). Such high amplitude, high frequency rapid power swings (especially for long duration workloads that can last weeks or months, which is typical) may place a strain on (and may damage) the mechanical and/or electrical components of a local electrical power grid supplying power to the data center. Existing solutions either waste power (e.g., by running dummy workloads) or incur significant costs (and thus overall system inefficiencies in terms of installation and maintenance; e.g., by installation of large capacitor-based energy storage or similar energy storage solutions). The present technology provides for filtering data center power load transients caused by AI workloads. In particular, the present technology directly monitors the AC power feed from the electrical power grid, and regulates the power swing that is loaded on the electrical power grid by the AI workloads, by running general compute workloads during OFF times for the AI workloads, thereby making productive use of energy burns typical of AI workload OFF times. In this manner, no energy is wasted, nor is there a need to add new devices such as energy storage capacitors or similar energy storage solutions, which are costly or operationally inefficient.

Figure 6:
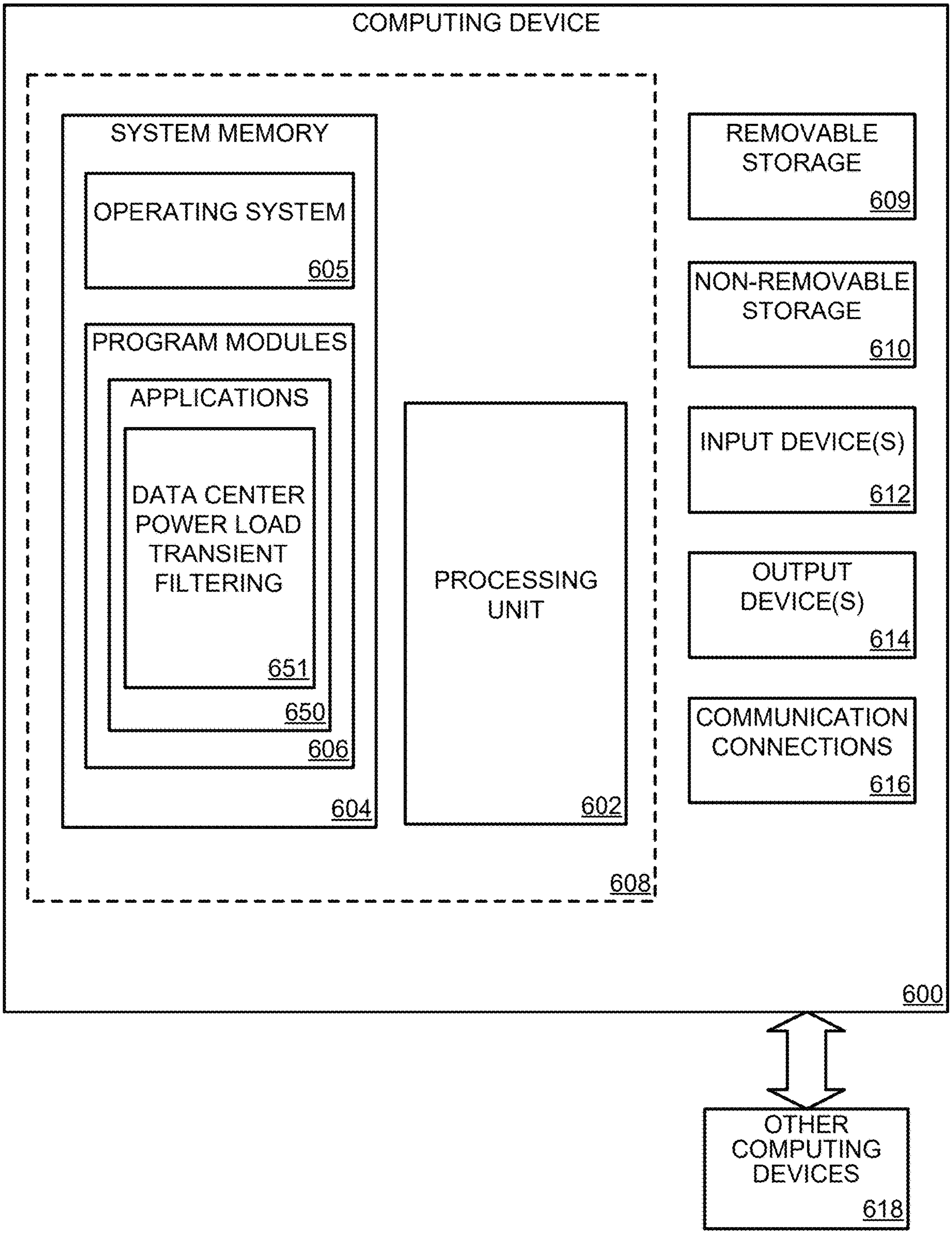
FIG. 6 depicts a block diagram illustrating example physical components of a computing device with which aspects of the technology may be practiced.

FIG. 6 depicts a block diagram illustrating physical components (i.e., hardware) of a computing device 600 with which examples of the present disclosure may be practiced. The computing device components described below may be suitable for a client device implementing the filtering of data center power load transients caused by AI workloads, as discussed above. In a basic configuration, the computing device 600 may include at least one processing unit 602 and a system memory 604. The processing unit(s) (e.g., processors) may be referred to as a processing system. Depending on the configuration and type of computing device, the system memory 604 may include volatile storage (e.g., random access memory), non-volatile storage (e.g., read-only memory), flash memory, or any combination of such memories. The system memory 604 may include an operating system 605 and one or more program modules 606 suitable for running software applications 650, such as AI workload power load transient filtering 651, to implement one or more of the systems or methods described above.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionalities. For example, the computing device 600 may also include additional data storage devices (which may be removable and/or non-removable), such as, for example, magnetic disks, optical disks, or tape. Such additional storage is illustrated in FIG. 6 by a removable storage device(s) 609 and a non-removable storage device(s) 610.

As stated above, a number of program modules and data files may be stored in the system memory 604. While executing on the processing unit 602, the program modules 606 may perform processes including one or more of the operations of the method(s) as illustrated in FIGS. 5A and 5B, or one or more operations of the system(s) and/or apparatus(es) as described with respect to FIGS. 1-4, or the like. Other program modules that may be used in accordance with examples of the present disclosure may include applications such as electronic mail and contacts applications, word processing applications, spreadsheet applications, database applications, slide presentation applications, drawing or computer-aided application programs, AI applications and ML modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 600 may also have one or more input devices 612 such as a keyboard, a mouse, a pen, a sound input device, and/or a touch input device, etc. The output device(s) 614 such as a display, speakers, and/or a printer, etc. may also be included. The aforementioned devices are examples and others may be used. The computing device 600 may include one or more communication connections 616 allowing communications with other computing devices 618. Examples of suitable communication connections 616 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 604, the removable storage device 609, and the non-removable storage device 610 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:

a workload orchestrator that executes computer executable instructions that cause the workload orchestrator to perform operations comprising:

receiving a first signal indicating that a first plurality of compute nodes is starting a compute phase during which artificial intelligence ("AI") workloads are executed by AI accelerators on the first plurality of compute nodes;

in response to receiving the first signal, causing a second plurality of compute nodes to stop execution of general workloads;

receiving a second signal indicating that the first plurality of compute nodes has completed the compute phase and is starting a communication phase during which AI data is exchanged among the AI accelerators on the first plurality of compute nodes; and in response to receiving the second signal, causing the second plurality of compute nodes to continue execution of the general workloads.

2. The system of claim 1, wherein the first plurality of compute nodes is disposed on and electrically powered by a first plurality of equipment racks, wherein the second plurality of compute nodes is disposed on and electrically powered by a second plurality of equipment racks, wherein the first and second plurality of equipment racks are arranged in one of the following configurations in a data center:

the second plurality of equipment racks includes some equipment racks within each of one or more rows of racks among a plurality of rows of racks, while the first plurality of equipment racks includes remaining equipment racks within each of the one or more rows of racks; or the second plurality of equipment racks includes all equipment racks in some of the plurality of rows of racks, while the first plurality of equipment racks includes all equipment racks in remaining rows among the plurality of rows of racks.

3. The system of claim 1, further comprising:

a power meter that measures a combined power draw by at least the first plurality of compute nodes and the second plurality of compute nodes;

wherein the workload orchestrator comprises:

an AI workload scheduler that schedules the AI workloads for the AI accelerators on each of the first plurality of compute nodes to execute;

a non-AI workload scheduler that schedules the general workloads for graphics processing units ("GPUs") on each of the second plurality of compute nodes to execute; and a rack/row controller system that allocates racks and rows for the AI workloads and for the general workloads.

4. The system of claim 3, wherein the power meter measures the combined power draw in one of a continuous, real-time manner or a periodic, near-real-time manner.

5. The system of claim 3, further comprising:

one or more power distribution units ("PDUs") that distribute electrical power to a plurality of equipment racks within each of a plurality of rows of racks, the plurality of equipment racks including a first plurality of equipment racks and a second plurality of equipment racks, the first plurality of compute nodes being disposed on and electrically powered by the first plurality of equipment racks, the second plurality of compute nodes being disposed on and electrically powered by the second plurality of equipment racks; and a power capper that sends control signals to each of the one or more PDUs to control power that is distributed separately to each of the first and second plurality of equipment racks;

wherein the AI workload scheduler computes an estimated maximum power draw for the first plurality of compute nodes during the compute phase, computes an estimated minimum power draw for the first plurality of compute nodes during the communication phase, selects a power threshold value between the estimated maximum power draw and the estimated minimum power draw, and sends the estimated maximum power draw, the estimated minimum power draw, and the power threshold value to the rack/row controller system; and wherein the rack/row controller system calculates an absorption power value corresponding to a difference between the power threshold value and the estimated minimum power draw, and sends the absorption power value to the power capper, the absorption power value corresponding to a maximum power draw that the second plurality of equipment racks should use during the communication phase to minimize a difference between a first overall power draw by the first plurality of compute nodes and the second plurality of compute nodes during the compute phase and a second overall power draw by the first plurality of compute nodes and the second plurality of compute nodes during the communication phase.

6. The system of claim 5, wherein the first signal is sent by the power meter to the rack/row controller system, wherein the first signal indicates that a current power draw by at least the first plurality of compute nodes and the second plurality of compute nodes exceeds the power threshold value, wherein causing the second plurality of compute nodes to stop execution of the general workloads includes sending, by the rack/row controller system, instructions to the power capper to instruct the one or more PDUs to throttle power feeding the second plurality of equipment racks to a first operational power level.

7. The system of claim 6, wherein the second signal is sent by the power meter to the rack/row controller system, wherein the second signal indicates that a current power draw by at least the first plurality of compute nodes and the second plurality of compute nodes falls below the power threshold value, wherein causing the second plurality of compute nodes to continue execution of the general workloads includes sending, by the rack/row controller system, instructions to the power capper to instruct the one or more PDUs to disable power throttling to the second plurality of equipment racks to set the power feeding the second plurality of equipment racks at a second operational power level that is greater than the first operational power level.

8. The system of claim 7, wherein the rack/row controller system instructs the power capper to control the one or more PDUs to provide power to the second plurality of equipment racks such that the power draw of the second plurality of equipment racks corresponds to the absorption power value, by performing one of:

determining a number of equipment racks corresponding to a power draw for performing the general workloads that matches the absorption power value, and assigning the number of equipment racks as the second plurality of equipment racks; or causing the one or more PDUs to cap the second operational power level of the second plurality of equipment racks at the absorption power value.

9. The system of claim 3, wherein the first signal is sent by the AI workload scheduler to the rack/row controller system, wherein the first signal indicates that the compute phase is starting, wherein causing the second plurality of compute nodes to stop execution of the general workloads includes sending, by the rack/row controller system, instructions to the non-AI workload scheduler to cause each of the second plurality of compute nodes to shift to a first operational mode.

10. The system of claim 9, wherein the second signal is sent by the AI workload scheduler to the rack/row controller system, wherein the second signal indicates that the communication phase is starting, wherein causing the second plurality of compute nodes to continue execution of the general workloads includes sending, by the rack/row controller system, instructions to the non-AI workload scheduler to cause each of the second plurality of compute nodes to shift to a second operational mode.

11. A computer-implemented method, comprising:

receiving, a workload orchestrator, a first signal indicating that a first plurality of compute nodes is starting a compute phase during which artificial intelligence ("AI") workloads are executed by AI accelerators on the first plurality of compute nodes;

in response to receiving the first signal, causing, by the workload orchestrator, a second plurality of compute nodes to stop execution of general workloads;

receiving, by the workload orchestrator, a second signal indicating that the first plurality of compute nodes has completed the compute phase and is starting a communication phase during which AI data is exchanged among the AI accelerators on the first plurality of compute nodes; and in response to receiving the second signal, causing, by the workload orchestrator, the second plurality of compute nodes to continue execution of the general workloads.

12. The computer-implemented method of claim 11, wherein the workload orchestrator comprises:

an AI workload scheduler that schedules the AI workloads for the AI accelerators on each of the first plurality of compute nodes to execute;

a non-AI workload scheduler that schedules the general workloads for graphics processing units ("GPUs") on each of the second plurality of compute nodes to execute; and a rack/row controller system that allocates racks and rows for the AI workloads and for the general workloads.

13. The computer-implemented method of claim 12, wherein the first plurality of compute nodes is disposed on and electrically powered by a first plurality of equipment racks, wherein the second plurality of compute nodes is disposed on and electrically powered by a second plurality of equipment racks, wherein the first signal is sent by a power meter to the rack/row controller system, wherein the first signal indicates that a current power draw by at least the first plurality of compute nodes and the second plurality of compute nodes exceeds a power threshold value, wherein causing the second plurality of compute nodes to stop execution of the general workloads includes sending, by the rack/row controller system, instructions to a power capper to instruct one or more PDUs to throttle power feeding the second plurality of equipment racks to a first operational power level.

14. The computer-implemented method of claim 13, wherein the second signal is sent by the power meter to the rack/row controller system, wherein the second signal indicates that a current power draw by at least the first plurality of compute nodes and the second plurality of compute nodes falls below the power threshold value, wherein causing the second plurality of compute nodes to continue execution of the general workloads includes sending, by the rack/row controller system, instructions to the power capper to instruct the one or more PDUs to disable power throttling to the second plurality of equipment racks to set the power feeding the second plurality of equipment racks at second operational power level, wherein the second operational power level is capped at an absorption power value corresponding to a difference between the power threshold value and an estimated minimum power draw for the first plurality of compute nodes during the communication phase.

15. The computer-implemented method of claim 12, wherein the first signal is sent by the AI workload scheduler to the rack/row controller system, wherein the first signal indicates that the compute phase is starting, wherein causing the second plurality of compute nodes to stop execution of the general workloads includes sending, by the rack/row controller system, instructions to the non-AI workload scheduler to cause each of the second plurality of compute nodes to shift to a first operational mode.

16. The computer-implemented method of claim 15, wherein the second signal is sent by the AI workload scheduler to the rack/row controller system, wherein the second signal indicates that the communication phase is starting, wherein causing the second plurality of compute nodes to continue execution of the general workloads includes sending, by the rack/row controller system, instructions to the non-AI workload scheduler to cause each of the second plurality of compute nodes to shift to a second operational mode, wherein an operational power level of the second operational mode is capped at an absorption power value corresponding to a difference between a power threshold value and an estimated minimum power draw for the first plurality of compute nodes during the communication phase.

17. A system, comprising:

a workload orchestrator, comprising:

an artificial intelligence ("AI") workload scheduler that schedules AI workloads for AI accelerators on each of a first plurality of compute nodes to execute;

a non-AI workload scheduler that schedules general workloads for graphics processing units ("GPUs") on each of a second plurality of compute nodes to execute, wherein the first plurality of compute nodes is disposed on and electrically powered by a first plurality of equipment racks, wherein the second plurality of compute nodes is disposed on and electrically powered by a second plurality of equipment racks; and a rack/row controller system that allocates racks and rows for AI workloads and for the general workloads;

wherein workload orchestrator that executes computer executable instructions that cause the workload orchestrator to perform operations comprising:

receiving, by the rack/row controller system and from a power meter, a first signal indicating that a current power draw by at least the first plurality of compute nodes and the second plurality of compute nodes exceeds a power threshold value, indicative of the first plurality of compute nodes starting a compute phase during which the AI workloads are executed by the AI accelerators on the first plurality of compute nodes;

in response to receiving the first signal, causing the second plurality of compute nodes to stop execution of the general workloads, by the rack/row controller system sending instructions to a power capper to instruct one or more power distribution units ("PDUs") to throttle power feeding the second plurality of equipment racks to a first operational power level;

receiving, by the rack/row controller system and from the power meter, a second signal indicating that a current power draw by at least the first plurality of compute nodes and the second plurality of compute nodes falls below the power threshold value, indicative of the first plurality of compute nodes having completed the compute phase and is starting a communication phase during which AI data is exchanged among the AI accelerators on the first plurality of compute nodes; and in response to receiving the second signal, causing the second plurality of compute nodes to continue execution of the general workloads, by the rack/row controller system sending instructions to the power capper to instruct the one or more PDUs to disable power throttling to the second plurality of equipment racks to set the power feeding the second plurality of equipment racks at a second operational power level.

18. The system of claim 17, wherein the rack/row controller system instructs the power capper to control the one or more PDUs to provide power to the second plurality of equipment racks such that the power draw of the second plurality of equipment racks corresponds to an absorption power value, by performing one of:

determining a number of equipment racks corresponding to a power draw for performing the general workloads that matches the absorption power value, and assigning the number of equipment racks as the second plurality of equipment racks; or causing the one or more PDUs to cap the second operational power level of the second plurality of equipment racks at the absorption power value;

wherein the absorption power value corresponds to a difference between the power threshold value and an estimated minimum power draw for the first plurality of compute nodes during the communication phase.

19. The system of claim 17, wherein the power meter that measures a combined power draw by at least the first plurality of compute nodes and the second plurality of compute nodes in one of a continuous, real-time manner or a periodic, near-real-time manner.

20. The system of claim 17, wherein the AI workload scheduler computes an estimated maximum power draw for the first plurality of compute nodes during the compute phase, computes an estimated minimum power draw for the first plurality of compute nodes during the communication phase, selects the power threshold value between the estimated maximum power draw and the estimated minimum power draw, and sends the estimated maximum power draw, the estimated minimum power draw, and the power threshold value to the rack/row controller system; and wherein the rack/row controller system calculates an absorption power value corresponding to a difference between the power threshold value and the estimated minimum power draw, and sends the absorption power value to the power capper, the absorption power value corresponding to a maximum power draw that the second plurality of equipment racks should use during the communication phase to minimize a difference between a first overall power draw by the first plurality of compute nodes and the second plurality of compute nodes during the compute phase and a second overall power draw by the first plurality of compute nodes and the second plurality of compute nodes during the communication phase.

* * * * *